United States Patent [19]

Schuler

[11] Patent Number: 4,702,269

[45] Date of Patent: Oct. 27, 1987

[54] BY-PASS VALVE

[75] Inventor: Fredrick E. Schuler, St. Paul, Minn.

[73] Assignee: Donaldson Company, Inc., Minneapolis, Minn.

[21] Appl. No.: 948,417

[22] Filed: Dec. 30, 1986

Related U.S. Application Data

[63] Continuation of Ser. No. 710,861, Mar. 12, 1985, abandoned.

[51] Int. Cl.[4] .................... F16K 5/08; F16K 51/00
[52] U.S. Cl. .................. 137/246.12; 137/246.22; 137/625.43; 55/314
[58] Field of Search .................. 137/625.43, 625.22, 137/250, 625.47, 246, 246.11, 246.22, 246.12, 246.13, 246.15, 246.16, 246.17, 246.18, 246.19, 246.2, 246.21, 625.29, 240, 625.46, 874, 876, 238; 277/3, 246.23; 55/312, 314

[56] References Cited

U.S. PATENT DOCUMENTS

| 275,406 | 4/1883 | Parsons . |
| 470,095 | 3/1892 | Atwood . |
| 572,724 | 12/1896 | Rumely ........................... 137/625.29 |
| 715,266 | 12/1902 | Heston ............................ 137/625.43 |
| 879,492 | 2/1908 | Richardson . |
| 1,534,958 | 4/1925 | Huss . |
| 1,695,554 | 12/1928 | Markels ............................ 55/314 |
| 1,721,737 | 7/1927 | Joyce ................................ 277/3 |
| 1,774,685 | 9/1930 | Vickers . |
| 1,863,652 | 6/1932 | Drew . |
| 2,038,886 | 4/1936 | Clade ............................... 137/246.17 |
| 2,110,557 | 3/1938 | Seifer ............................. 137/246.22 |
| 2,373,742 | 4/1945 | Clade ............................... 137/246.14 |
| 2,701,645 | 2/1955 | Eicher et al. . |
| 2,921,604 | 1/1960 | Zettl . |
| 3,101,752 | 8/1963 | Martin ............................ 137/625.43 |
| 3,166,098 | 1/1965 | Jennings . |
| 3,306,171 | 2/1967 | Gordon . |
| 3,834,372 | 9/1974 | Turney . |
| 3,946,752 | 3/1976 | Yamamoto ....................... 137/246 |
| 4,116,208 | 9/1978 | Smith ............................. 137/246.22 X |
| 4,173,234 | 11/1979 | Thomas et al. . |
| 4,318,424 | 3/1982 | Bajka . |
| 4,339,333 | 7/1982 | Sjöberg ............................ 55/314 |
| 4,345,923 | 8/1982 | Schoen . |
| 4,517,083 | 5/1985 | Hayes et al. ..................... 55/314 |

Primary Examiner—George L. Walton
Attorney, Agent, or Firm—Merchant, Gould, Smith, Edell, Welter & Schmidt

[57] ABSTRACT

The present invention is directed to a valve having a plug with a pair of passages therethrough and a housing with ports which communicate with the passages of the plug in at least two orientations to form flow paths through the valve. The valve includes a space located at the interface of the plug and housing which, when pressurized, assures that fluid leakage between the flow paths of the valve is prevented in either the first or second orientation of the valve. In the preferred embodiment of the valve the space is defined by first and second endless paths which are orthogonal to each other and intersect at the poles of the axis of rotation of the plug. Seal members may be disposed along each endless path to further assure the integrity of established flow paths through the valve.

4 Claims, 23 Drawing Figures

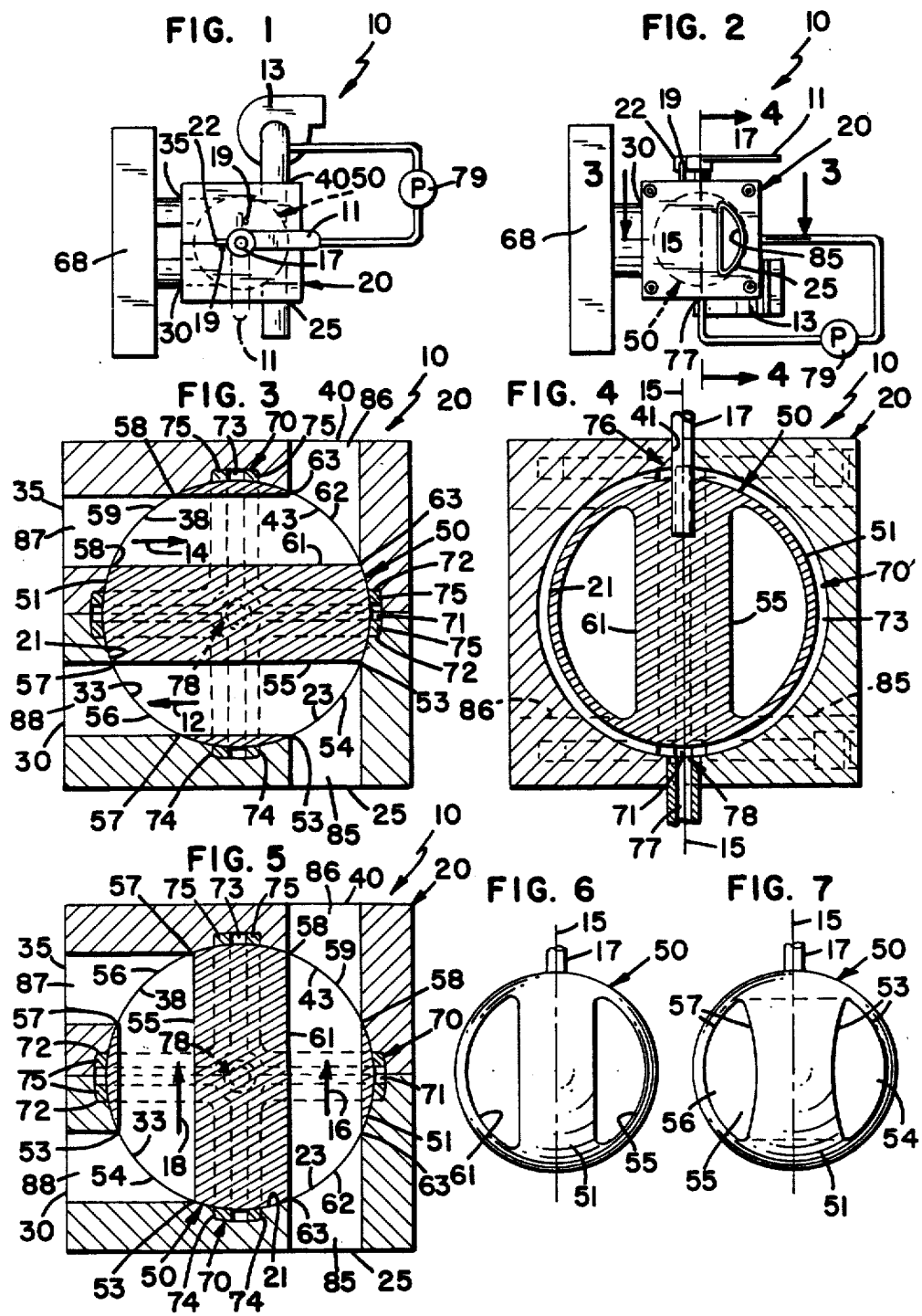

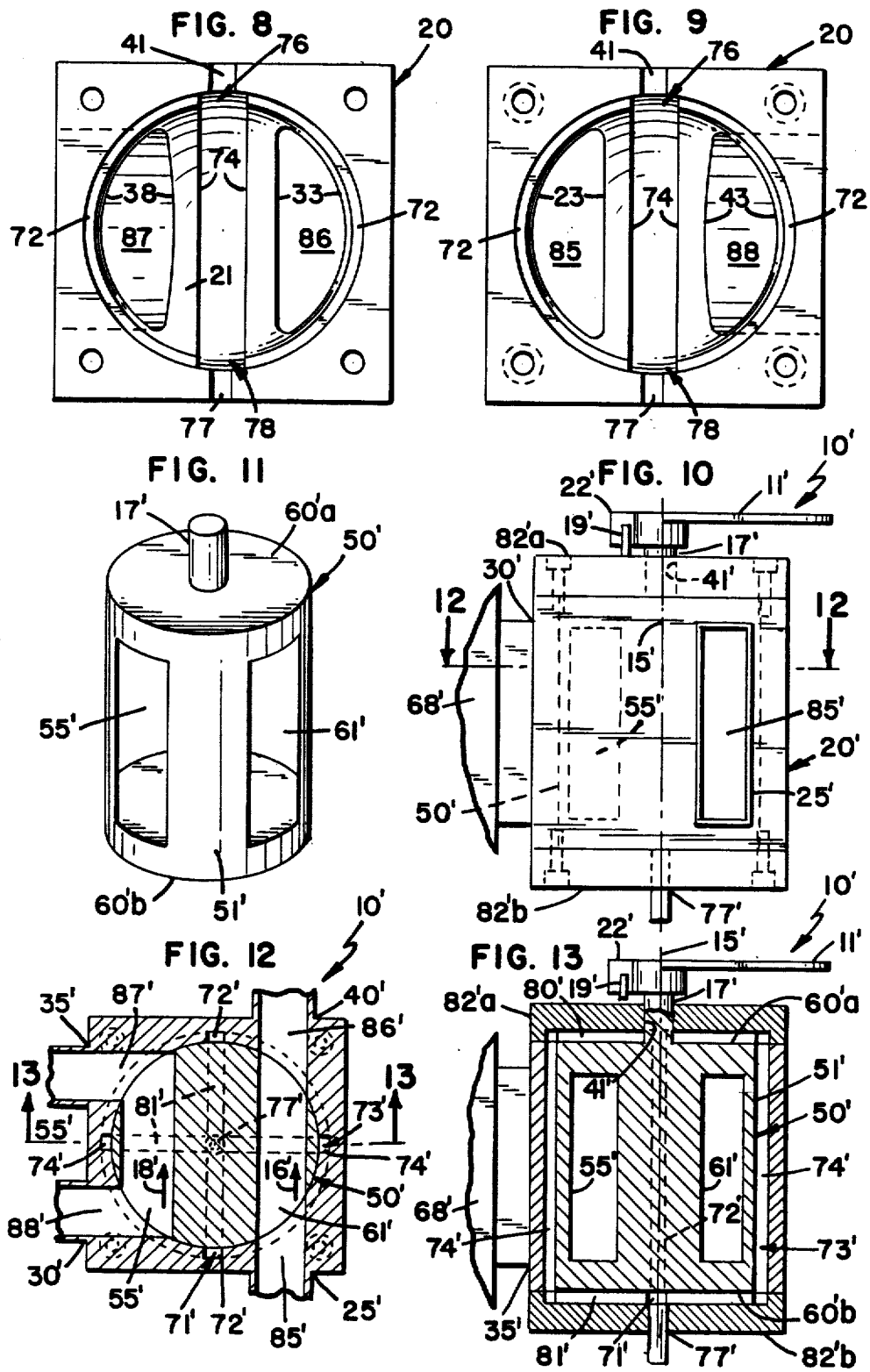

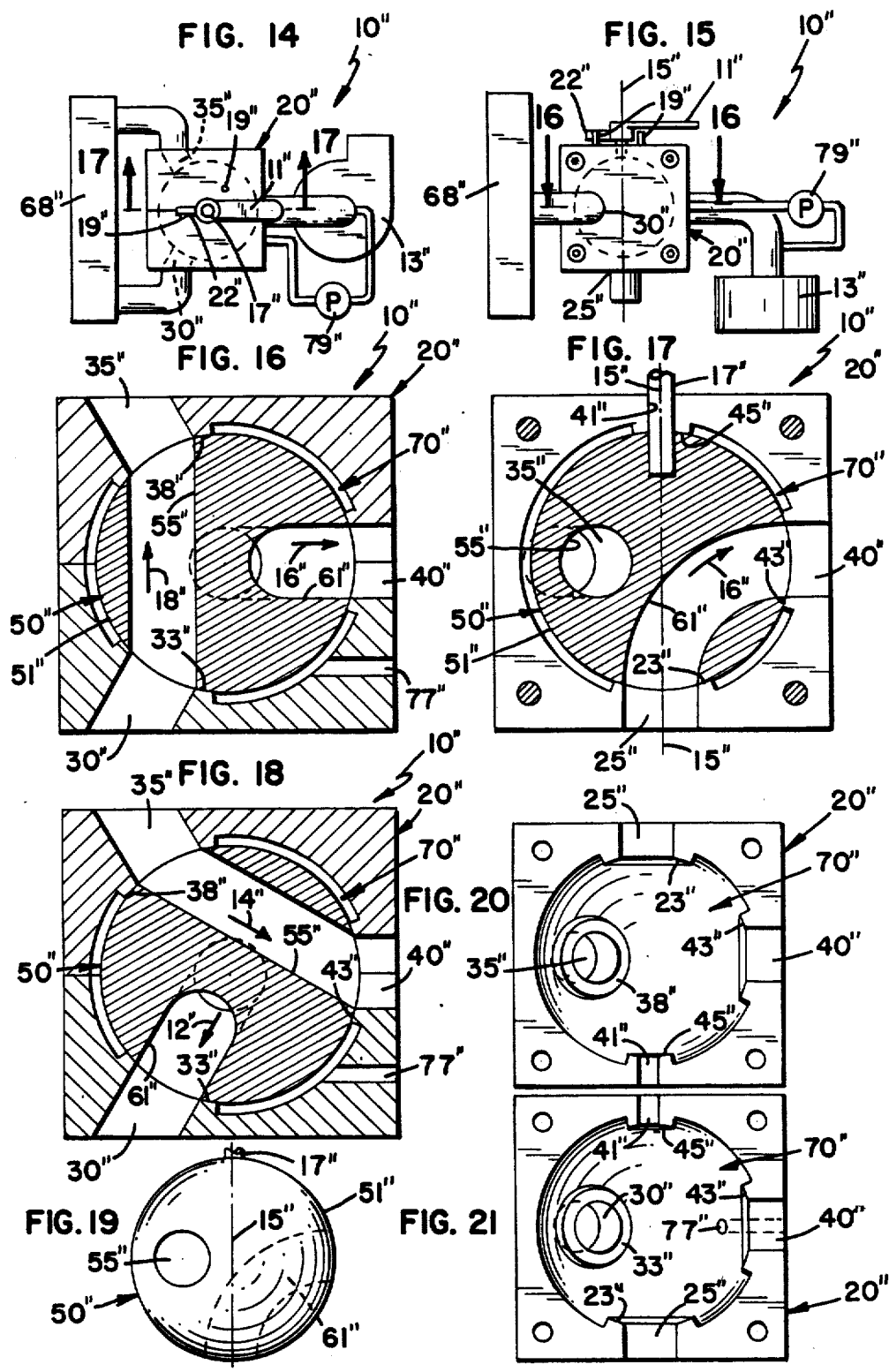

BY-PASS VALVE

This is a continuation of application Ser. No. 710,861, filed Mar. 12, 1985, now abandoned.

TECHNICAL FIELD

The present invention relates generally to the field of valves. More particularly, the preferred valve is embodied as a two-way, four port valve capable of, for example, directing fluid flow through a filter or alternatively directing fluid flow to by-pass the filter. The valve is designed to insure the integrity of the filtering mode in extremely hostile environments.

BACKGROUND OF THE INVENTION

There are occasions where an isolated enclosed space must be used even though the atmosphere surrounding the space becomes polluted with contaminants noxious to personnel or damaging to equipment in the space. Contaminants may be considered noxious based on corrosiveness, radioactivity or high temperature. Examples of environments which may be susceptible to noxious contaminants include armored tanks, collapsible personnel shelters, and personnel carriers. Also, oil and recovery injection wells are susceptible to hydrogen sulfide gas leakage which may present a hazard to individuals and machinery in the vicinity of the well.

Protection of an enclosed space, such as those listed above, from noxious contaminants, is usually accomplished by providing a filtering unit for the space. In the case of nuclear particles, biological agents and noxious chemicals, these filters generally consist of at least three stages of filtration: first, a roughing filter stage to remove the bulk of the dust entrained in the incoming air; second, a Hepa filter stage to remove biologic agent and any liquid or solid chemicals; and finally, an activated charcoal filter to remove gaseous noxious chemicals.

In the case of war machines such as armored tanks or personnel shelters, normal ventilation of the habitable space of the tank or shelter is provided by a blower, which is capable of raising the pressure of the interior space so that air leakage is outward and agent anti-penetration integrity is preserved. It is most important to the integrity of the filtering system that any possible leaks in the filter unit are from higher pressure clean air to lower pressure dirty air.

When going from the normal ventilation mode to a protective operating mode, a by-pass valve or series of valves is required to shut the normal ventilation air passageway tight and to open air inlet and outlet passageways for the filtering unit. The change from the ventilation mode to a protective filtering mode must be done quickly and reliably in extremely hostile environments.

Prior protective filtering systems consist of one or two flapper valves, which are closed against the filter unit inlet and outlet passages, sealing them and the filter from contaminants present in the normal ventilation air. On demand, these valves are forced to opposing seats in the by-pass ventilation air passageway, closing it and opening passages to allow the filtering unit to operate. This type of flapper valve has been subject to problems in that the seats and flappers, which must close air tight reliably, are exposed to dust, dirt, moisture and humidity which may be present in the normal ventilation air; such exposure may result in the by-pass valve failing to shut reliably. Sealing an environment through the use of flapper-type valves has been made somewhat more reliable by pressurizing the space between the two flappers with cleaned air from the interior pressurized habitable space, thus if the upstream valve does not seal perfectly, the leak will be from the space between the valves to the dirty air side. However, this is only the case when the leak is small. Larger obstructions on both sealing surfaces for upstream and downstream valves would overcome the pressurized flow resulting in a leak in the system.

Providing a by-pass valve which assures the integrity of the filtering mode in extremely noxious environments is highly desirable. The present invention meets the requirements of high reliability and advances the state of the art beyond that which is known at this time.

SUMMARY OF THE INVENTION

The present invention relates to a by-pass valve for a filtering unit, having a plug with at least two passages therethrough with opposing end openings and a housing for receiving said plug. The plug and housing communicate with each other to form flow paths therethrough in at least two orientations of the valve. The plug and housing fit closely adjacent to one another to minimize fluid flow therebetween. A feature of the invention is that it includes structure for distributing a pressurized fluid and mechanism for pressurizing the distributing means with fluid. The distributing structure is disposed at the interface of the housing and the plug and separates the flow paths of the plug from each other in the various orientations of the valve. The pressurized fluid in the distributing means tends to flow towards the flow paths thereby preventing the fluid in either flow path in either orientation of the plug from leaking into each other. The pressurized distributing means insures that the integrity of the fluid flow through the passages of the valve is maintained, thereby providing an extremely reliable by-pass valve for a filtering unit.

Various advantages and features of novelty which characterize the invention are pointed out with particularity in the claims annexed hereto and forming a part hereof. However, for a better understanding of the invention, its advantages, and objects obtained by its use, reference should be had to the drawings which form a further part hereof and to the accompanying descriptive matter, in which there are illustrated and described preferred and other embodiments of the invention.

BRIEF DESCRIPTION OF THE DRAWINGS

In the drawing, in which like reference numerals indicate corresponding parts throughout the several views, FIG. 1 is a top plan view of a filtering unit containing a by-pass valve in accordance with the present invention;

FIG. 2 is a side elevational view of the apparatus in FIG. 1;

FIG. 3 is an enlarged sectional view as seen from the line 3—3 of FIG. 2;

FIG. 4 is an enlarged sectional view as seen from the line 4—4 of FIG. 2;

FIG. 5 is a view similar to FIG. 3 showing a different position of the parts thereof;

FIG. 6 is an elevational view of the rotor element of FIG. 4 removed from the housing;

FIG. 7 is an elevational view of the rotor element of FIG. 6 rotated 90 degrees on its vertical axis;

FIG. 8 is an elevational view of a half section of a by-pass valve housing of the type shown in FIGS. 1-5;

FIG. 9 is an elevational view of the corresponding half section of the by-pass valve housing In FIG. 8;

FIG. 10 is an elevational view of an alternate embodiment of a by-pass valve in accordance with the present invention;

FIG. 11 is a perspective view of the rotor element of the alternate embodiment shown in FIG. 10;

FIG. 12 is a sectional view as seen from line 12—12 of FIG. 10;

FIG. 13 is a sectional view as seen from line 13—13 of FIG. 12;

FIG. 14 is a top plan view of a filtering device containing a further embodiment of a by-pass valve in accordance with the invention;

FIG. 15 is a side elevational view of the filtering unit containing the further embodiment of the by-pass valve of FIG. 14;

FIG. 16 is an enlarged sectional view as seen from the line 16—16 of FIG. 15;

FIG. 17 is an enlarged sectional view as seen from the line 17—17 of FIG. 14;

FIG. 18 is a view similar to that shown in FIG. 16 but showing different positions of the parts thereof;

FIG. 19 is an elevational view of the rotor element of FIG. 18 removed from the housing;

FIG. 20 is an elevational view of a housing half section of the by-pass valve as shown in FIG. 18; and FIG. 21 is an elevational view of the corresponding housing half section shown in FIG. 18.

DETAILED DESCRIPTION OF THE PREFERRED EMBODIMENT

Figure 22:
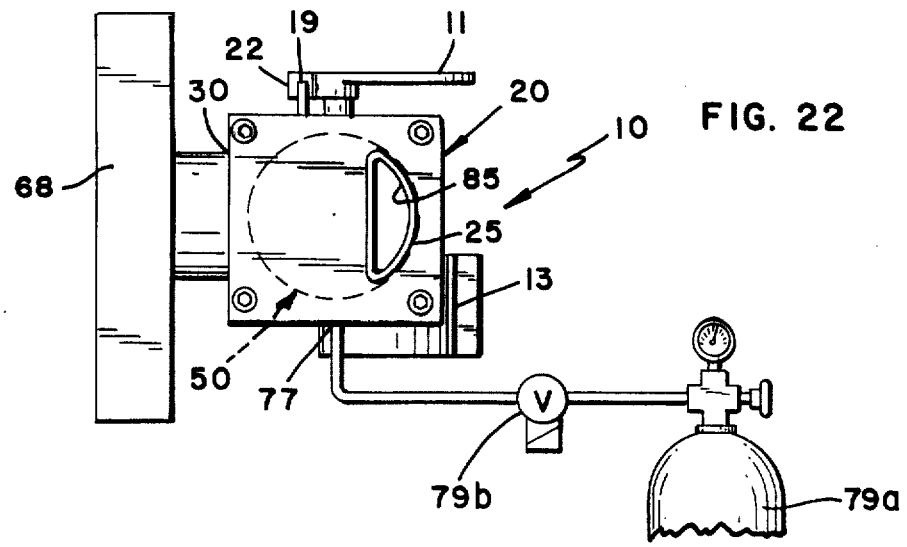
FIG. 22 is a view similar to FIG. 2 but showing an alternate clean air supply.
Figure 23:
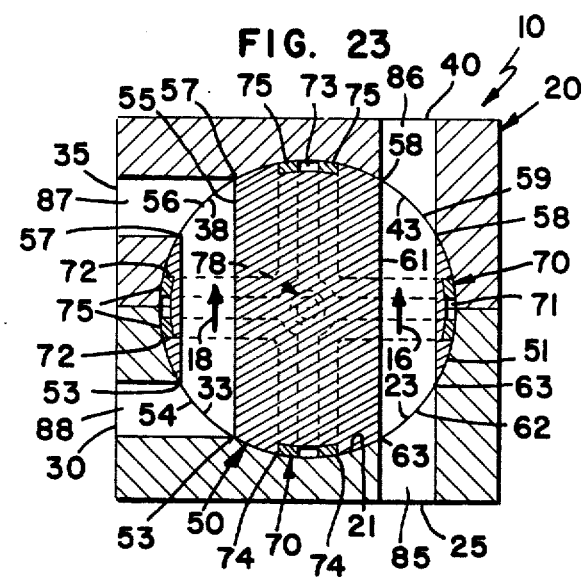
FIG. 23 is a view similar to FIG. 5 but showing a different arrangement of parts.

Referring now to the drawings, there is shown in FIGS. 1-9 a preferred embodiment of the present invention generally referred to by the reference numeral 10. As is illustrated, the preferred embodiment of the present invention includes a plug 50 seated within a receiving housing 20.

In one preferred embodiment, the plug 50 is generally spherical and has a first plug passage 55 and a second plug passage 61 therethrough. The first passage 55 has opposite end openings 54, 56 defined by facing surfaces 53 and 57, respectively. The second passage 61 has end openings 59, 62 defined by facing surfaces 58 and 63, respectively. In the preferred embodiment, the passageways 55, 61 are parallel to each other, lying in the same plane and have end openings 54, 56, 59, 62 centered at the equator of the plug 50 which is defined by the plane. The end openings 54, 56, 59, 62 are angularly spaced 90 degrees apart about the axis of rotation 15 which is perpendicular to the equatorial plane. It will be appreciated that although a generally spherical plug 50 is described above, the plug can also be of conical section.

The valve housing 20 includes passages 85, 86, 87 and 88 having an interior end defining an inlet port 25, an outlet port 40 and a pair of transfer ports 35, 30, respectively, each port having a surrounding seating surface 23, 43, 38, 33, respectively. In the preferred embodiment, the ports 25, 30, 35, 40 are arranged to align with the end openings 54, 56, 59, 62 of plug passages 55, 61, in two different orientations. In a first orientation, shown in FIG. 3, end openings 54, 56, 59, 62 are aligned with and form mating pairs with ports 25, 30, 35 and 40 respectively. The alignment of end openings and ports in the first orientation places inlet port 25 in fluid communication with transfers port 30 through a first flow path 12, also in this orientation, transfer port 35 is in fluid communication with outlet port 40 through a second flow path 14.

The first orientation of the plug 50 in the housing 20 directs fluid entering the valve through inlet 25 through flow path 12 and transfer port 30 to a filtering unit 68 for removal of the noxious components from the fluid. After passing through the filtering unit, fluid reenters the valve through transfer port 35 and passes through flow path 14 to outlet port 40, thereby delivering filtered fluid to an internal space. Fluid leakage between flow paths 12, 14 is minimized by the close fitting of seating surfaces 23, 33, 38, 43 adjacent to facing surfaces 53, 57, 58 and 63 respectively. Fluid is caused to flow in the above manner by means of a prime mover or fan 13.

Plug 50 is rotated 90 degrees about its axis of rotation 15 to align the end openings and ports in a second orientation. FIG. 5 illustrates the second orientation of the valve 10 resulting from a 90 degree rotation of the plug 50 in a clockwise direction. Although FIG. 5 illustrates a clockwise rotation of the plug 50 from that shown in FIG. 3, movement of the plug 50 from the first to the second orientation can be achieved by rotating the plug 90 degrees in a counterclockwise direction as well. Operation of the valve is simplified, however, by limiting rotation of the plug to one direction and the reversal thereof. In the preferred embodiment plug 50 is limited to 90 degree rotation in one direction by valve stops 19 located on the surface of the housing 20 and engagable by abutment 22 of handle 11. Movement of the plug 50 between the first and second orientations of the valve is accomplished by means of a shaft 17 attached to and extending outwardly from the axis of rotation 15 of the plug 50 through an opening 41 in the housing 20. The free end of the shaft includes a handle 11 for rotating the plug 50 between the first and second orientations of the valve 10.

In the second orientation, inlet port 25 and outlet port 40 are in fluid communication through a third flow path 16. Transfer ports 30 and 35 are in fluid communication through a fourth flow path 18. More specifically, in the second orientation end openings 62, 54, 56, 59 are aligned with and form mating pairs with ports 25, 30, 35 and 40 respectively.

In the second orientation of the valve fluid entering through inlet 25 passes directly through the third flow path to outlet 40 and the internal space bypassing the filtering unit. Fluid leakage between flow paths 16, 18 is minimized in the second orientation by the close fitting of seating surfaces 23, 33, 38, 43 adjacent to facing surfaces 63, 53, 57 and 58 respectively.

A key feature of the present valve is the distributing mechanism 70 situated at the interface of the housing 20 and the plug 50. This feature results in the enhanced capability of the present valve to insure the integrity of the filtering mode of a system in the presence of extreme temperature or noxious contaminants. In the preferred embodiment shown in FIGS. 1-9, the distributing mechanism 70 is characterized by a first space 71 and second space 73 at the interface between the plug 50 and housing 20. More particularly the first and second spaces 71, 73 are configured in the inner surface 21 of the housing 20 in the embodiment shown. The first space 71 defines an endless path which separates the first flow path 12 and second flow path 14 when the valve is in its first orientation as shown in FIG. 3. The second space 73 forms a second endless path which in the second orientation of the valve separates the third 16 and fourth 18 flow paths, as shown in FIG. 5. It should be appreciated that the first and second spaces 71, 73 may be formed in the inner surface 21 of the housing 20 or the outer surface 51 of the plug 50 or both.

In an embodiment having the first and second spaces 71, 73 formed in the outer surfaces 51 of the plug 50 rather than in the interior surface 21 of the housing 20 the first space 71 will separate the first flow path 12 and second flow path 14 when the valve is in its first orientation similar to that shown in FIG. 3. However, when the first and second spaces 71, 73 are formed in the outer surface 51 of the plug 50, rotation of the plug 50 within the housing 20 will result in the first space 71 also separating the third flow path 16 and the fourth flow path 18 in the second orientation of the valve. Regardless of whether the first and second spaces 71, 73 are formed in the housing 20, the plug 50, or both, the first and/or second space 71, 73 separate each flow path from another flow path in all orientations of the valve.

In the preferred embodiment shown in FIGS. 1-9 the first and second spaces 71, 73 are each grooves in the shape of a ring. Additionally, first and second spaces 71, 73 are orthogonal with respect to one another. First and second spaces 71, 73 cross one another at first and second intersections 76, 78 located at the poles of the axis of rotation 15. Preferably, the shaft 17 for rotating the plug 50 within the housing 20 is centered at the first intersection 76 and journaled for rotation in the opening 41 formed in housing 20. Fluid communication at first and second intersections 76, 78 between the first space 71 and second space 73 assures that the integrity of each flow path is maintained in both orientations of the valve when the spaces 71, 73 are pressurized.

Pressurization of the first and second spaces 71, 73 is accomplished by introducing a fluid, such as air, into the first and second spaces 71, 73 through an inlet passage 77. One means for introducing such fluid may be a pump 79 diagramatically shown in FIGS. 1 and 2. The outlet of pump 79 may be connected to inlet 77 and the inlet of pump 79 may be connected to the outlet 40. This provides filtered air to pump 79 and spaces 71, 73 in the presence of noxious contaminents. Alternatively, a tank of compressed fluid, 79a would provide uncontaminated fluid or air to the inlet 77 as shown in FIG. 22. When a tank of compressed fluid 79a is used, an excessive loss of pressurizing fluid during actuation of the valve may be prevented by providing means for isolating the tank of compressed fluid 79a from the valve 10. For this purpose, a valve 79b may be inserted between the tank of compressed fluid 79a and inlet passage 77. A variety of electrically or mechanically actuating control valves could be used. For example, the valve 79b could be a solenoid operated valve.

Inlet passage 77 defines a channel through the housing 20 to the second intersection 78. Introducing a fluid into the first and second spaces 71, 73 at a pressure greater than that of the fluid present within the established flow paths of the valve prevents leakage of fluid from one flow path to the other. More specifically, the first space 71 separates flow paths 12 and 14 in the valve's first orientation while the second space 73 separates flow paths 16 and 18 in the valve's second orientation. By maintaining a pressure in the first 71 and second 73 spaces which is higher than the pressure of the fluid in the established flow paths the pressurized fluid in the first and second space 71 and 73 tends to flow toward the flow paths in each orientation of the valve thereby preventing fluid in either flow path in either orientation of the plug 50 from leaking into the other flow path.

By way of example, when the valve is in the filtering mode as illustrated in FIG. 3, fluid directed through flow path 12 into the filter and outward from the filter through flow path 14 will be prevented from leaking between flow paths 12 and 14. This assures that when the valve is in the filtering mode unfiltered fluid will be unable to pass to the outlet 40 without being filtered. In the case of a tank or personnel carrier being subjected to exterior air polluted with potentially lethal contaminants, the pressurized spaces 71, 73 of the by-pass valve assure that no contaminants will leak into the interior environment of the enclosed personnel space.

In appropriate environments, those not subjected to intense heat or corrosiveness, the preferred embodiment of the valve 10 may include seal members 75 along the edges 72, 74 of the first and second spaces 71, 73 respectively. The seal members 75 enhance the valves capability to prevent leakage between flow paths. The seals members 75 also minimize leakage of pressurized fluid from the first and second spaces 71, 73 and provides additional sealing capability which could be relied on should the external pressurized fluid source to the distributing mechanism 70 fail.

FIGS. 11-13 illustrate an alternate embodiment of the by-pass valve 10' wherein like parts carry like reference numerals with a prime mark added. As illustrated in FIGS. 11-13, the plug 50' is cylindrical and has opposite ends 60'a, 60'b. The plug is spaced from the housing 20' at the ends 60'a, 60'b by a spider formation to create end cavities 80', 81'. The spider formation is formed as part of the housing 20' or plug 50' (in this case the housing 20'). As in the case of the preferred embodiment 10, the plug 50' includes passages 55', 61' therethrough, each passsge including end openings. The first space 71' of the valve 10' includes a set of grooves 72' extending between the end cavities 80', 81' and located between adjacent end openings of different passages 55', 61'. The second space 73' includes a second set of grooves 74' extending between the end cavities 80', 81' of the end openings of the same passage of both passages 55', 61' such that one of the grooves of the first and second set 72', 74' is on each side of each of the end openings of the passages 55', 61'.

The valve 10' includes an inlet passage 77' through the housing 20' to one of the end cavities 80', 81' (in this case cavity 81'). Pressurized fluid introduced to the spaces 71', 73', as in the manner above described, tends to flow toward the flow paths of the valve in a manner similar to that in the preferred embodiment, thereby assuring that no leakage occurs between flow paths. Also, the valve 10' includes a shaft 17' passing through an opening 41' in end wall 82'a of the housing 20' for attachment to the plug 50' along the axis of rotation 15' of the plug 50'.

FIGS. 14-21 illustrate a further alternate embodiment of the invention wherein like parts will carry like reference numerals with a double prime mark added. The valve 10" shown in FIGS. 16-21 operates in an identical manner to the preferred embodiment 10 and has a generally spherical plug 50" including the passageways 55", 61". However, the input port 25" of the valve 10" is centered at the axis of rotation 15". The transfer ports 30", 35" and outlet port 40" are centered at the equator of the plug 50" and are angularly spaced 120 degrees apart about the axis of rotation 15". The input port 25" is angularly spaced 90 degrees apart from each of the transfer ports 30", 35" and the outlet port 40". Movement of the plug 50" from the first to the second orientation of the valve 10" to achieve desired alignment of passageways 55", 61" and ports 25", 30", 35" and 40" requires a rotation of 120 degrees about the axis of rotation 15" of the plug 50".

In contrast to the previously discussed embodiments in which the distributing mechanism is characterized by a first space and a second space, in this alternative embodiment, the distributing mechanism 70" defines a single void volume between the plug 50" and housing 20". The plug 50" is mounted within the distributing mechanism 70" by raised facing surfaces 23", 33", 38", 43" and 45" surrounding each port 25", 30", 35", 40" and opening 41" respectively. As in the previously discussed embodiments, the ports of the housing 20" and end openings of the plug 50" form corresponding mating pairs in both orientations of the valve 10". The particular configuration of this embodiment of the valve allows the maximum size of round port and port seal area to be accommodated on a particular size of plug.

It is to be understood, however, that even though numerous advantages and characteristics of the invention have been set forth in the foregoing description, together with details fo the structure and function of the invention, the disclosure is illustrative only, and changes may be made in detail, especially in matters of size and shape of the parts within the principle of the invention, to the full extent indicated by the broad general meaning of the terms of which the appended claims are expressed.

What is claimed is:

1. A by-pass valve, comprising:
   a generally spherical plug having an outer surface and at least two plug passages therethrough, said plug passages having opposing end openings defined by facing surfaces;
   a housing for receiving said plug in a closely fitting relationship, said housing having a generally spherical inner surface including a plurality of housing passages having a plurality of ports, each of said ports having a surrounding seating surface, said ports being arranged to align with the end openings of at least two of said plug passages in at least a first orientation of said plug with respect to said housing to from a first group of corresponding mating pairs of said ports and said end openings and to form a first set of flow paths through said plug and housing passages and said first group of corresponding mating pairs, and a second orientation of said plug with respect to said housing to form a second group of corresponding mating pairs of said ports and said end openings and to form a second set of flow paths through said plug and housing passages and said second group of corresponding mating pairs, the seating surface of said port and the facing surface of said end opening of all of said corresponding mating pairs fitting closely adjacent to one another to minimize fluid flow therebetween;
   first and second ring-like grooves orthogonally disposed in said inner surface of said housing, facing said outer surface of said plug, for distributing a pressurized fluid, said grooves separating the flow paths of said first set for said first orientation from each other and the flow paths of said second set for said second orientation from each other, said grooves completely surrounding each of said flow paths with respect to the other for both first and second sets of flow paths;
   means for pressurizing said grooves with fluid, said pressurized fluid in said grooves flowing toward said flow paths along said outer surface of said plug, thereby preventing fluid in each flow path from leaking into other flow paths in either orientation of said plug; and
   means for moving said plug with respect to said housing between the first and second orientations.

2. A by-pass valve, comprising:
   a plug having first and second plug passages therethrough;
   a housing for receiving said plug, said housing enclosing said plug to form an interface, said housing including a plurality of housing passages having ends defining an inlet port, an outlet port, and a pair of transfer ports, said ports being arranged so that in a first orientation of said plug with respect to said housing said first plug passage aligns with said inlet port and said first transfer port for a first flow path and said second plug passage aligns with said second transfer port and said outlet port for a second flow path and so that in a second orientation of said plug with respect to said housing said first plug passage aligns with said inlet port and said outlet port for a third flow path and said second plug passage aligns with said first and second transfer ports for a fourth flow path;
   a first space in at least one of said plug and said housing at the interface between said plug and said housing, said first space forming a first endless path which separates said first and second flow paths;
   a second space in at least one of said plug and said housing at the interface between said plug and said housing, said second space forming a second endless path which separates said third and fourth flow paths, said first and second endless paths being in fluid communication with one another;
   means for pressurizing said first and second spaces with a fluid, said pressurized fluid in said first and second spaces flowing toward said flow paths along said interface, thereby preventing fluid in either flow path in either orientation of said plug from leaking into the other, said first and second spaces are each grooves shaped like a ring and are orthogonal with respect to one another, said first and second spaces crossing one another at first and second intersections, said pressurizing means including an inlet passage through said housing at said first intersection, and
   means for moving said plug with respect to said housing between the first and second orientation.

3. The valve in accordance with claim 2 wherein said plug at is spherical and said moving means including a shaft for rotating said plug at said second intersection.

4. The valve in accordance with claim 2 wherein said plug is cylindrical and has opposite ends, said plug being spaced from said housing at said ends to create end cavities, wherein each of said plug passages has end openings, wherein said first space includes a first set of grooves extending between said cavities and is located between adjacent end openings of different of said plug passages, and wherein said second space includes a second set of grooves extending between said end cavities and is located between the end openings of the same plug passage of both said plug passages, whereby one of said grooves of said first and second set is on each side of each of said end openings of said plug passages.

* * * * *

UNITED STATES PATENT AND TRADEMARK OFFICE
CERTIFICATE OF CORRECTION

PATENT NO. : 4,702,269

DATED : October 27, 1987

INVENTOR(S) : Fredrick E. Schuler

It is certified that error appears in the above-identified patent and that said Letters Patent is hereby corrected as shown below:

Column 3, line 4, "In" should be --in--.

Column 5, line 47, "contaminents" should be --contaminants--.

Column 6, line 3, "space" should be --spaces--.

Column 6, line 40, "passsge" should be --passage--.

Column 7, line 28, "fo" should be --of--.

Column 8, line 60, after "said" insert --end--.

Signed and Sealed this

Fifth Day of July, 1988

Attest:

DONALD J. QUIGG

*Attesting Officer*   *Commissioner of Patents and Trademarks*